United States Patent Office.

JAMES H. McCARTNEY, OF DANSVILLE, NEW YORK.

Letters Patent No. 90,048, dated May 11, 1869.

IMPROVED TONIC BITTERS.

The Schedule referred to in these Letters Patent and making part of the same.

*To all whom it may concern:*

Be it known that I, JAMES H. MCCARTNEY, of Dansville, in the county of Livingston, and State of New York, have invented certain new and useful Improvements in Tonic Bitters; and I do hereby declare that the following is a full, clear, and exact description thereof, reference being had to the accompanying drawings, and to the letters of reference marked thereon, which form a part of this specification.

The nature of my invention consists in providing a more efficient and positive remedy for all diseases of the liver, and as a new and valuable agent in general debility, being mild in its action, but positive and firm in its effects upon the system.

To enable others skilled in the art to make and use my invention, I will describe its ingredients and the mode of preparing the compound.

The ingredients are simply the fluid extract and tinctures of the herbs used in the composition, viz:

Fluid extract of balmony, (*Chelone glabra;*) tincture of mandrake, (*Podophyllum peltatum;*) tincture of juniper, (*Juniper communis;*) and tincture of ginger, (*Zingiber officinalis;*) to be compounded in the following proportions.

Fluid extract of balmony, sixteen parts.
Tincture of mandrake, two parts.
Tincture of juniper, two parts.
Tincture of ginger, one part.

What I claim as new, and desire to secure by Letters Patent, is—

A preparation, compounded substantially in the manner and for the purpose described.

In testimony that I claim the foregoing as my own, I affix my signature, in presence of two witnesses.

J. H. McCARTNEY.

Witnesses:
   CH. SEYLER,
   C. R. KERR.